(12) United States Patent
DeGroff et al.

(10) Patent No.: US 11,919,130 B2
(45) Date of Patent: Mar. 5, 2024

(54) TOOL FOR INSTALLATION AND/OR REMOVAL OF A PITOT TUBE COVER

(71) Applicant: DeGroff Aviation Technologies, Berne, IN (US)

(72) Inventors: Steven A. DeGroff, Decatur, IN (US); Phillip R. Russel, Fort Wayne, IN (US); David J. Hockemeyer, Hoagland, IN (US)

(73) Assignee: DeGroff Aviation Technologies, Berne, IN (US)

( * ) Notice: Subject to any disclaimer, the term of this patent is extended or adjusted under 35 U.S.C. 154(b) by 0 days.

(21) Appl. No.: 17/738,145

(22) Filed: May 6, 2022

(65) Prior Publication Data

US 2022/0355450 A1 Nov. 10, 2022

Related U.S. Application Data

(60) Provisional application No. 63/185,505, filed on May 7, 2021.

(51) Int. Cl.
*B25B 27/02* (2006.01)
*B64F 5/10* (2017.01)

(52) U.S. Cl.
CPC .............. *B25B 27/02* (2013.01); *B64F 5/10* (2017.01)

(58) Field of Classification Search
CPC ........ B23P 11/00; B23P 11/005; B25B 27/02; B25B 27/06; B25B 27/14; Y10T 29/53652; Y10T 29/53657; Y10T 29/53678; Y10T 29/53909–53917; Y10T 29/53943; Y10T 29/53952; Y10T 29/53961; Y10T 29/53987; Y10T 29/53991; B64F 5/10; B64F 5/40; B64F 1/005; B25G 1/102; Y10S 16/12
USPC ......... 29/244, 280, 235, 238, 255, 272, 282; 16/430, DIG. 12
See application file for complete search history.

(56) References Cited

U.S. PATENT DOCUMENTS

| | | | | |
|---|---|---|---|---|
| 6,003,205 | A * | 12/1999 | Dehaven | B65D 23/106 220/759 |
| 6,729,496 | B2 * | 5/2004 | Kenny | A47G 23/0266 220/742 |
| 8,214,989 | B1 * | 7/2012 | Jefferson | B25B 27/14 269/6 |
| 9,771,180 | B2 * | 9/2017 | Iwashita | B65D 23/10 |
| 2020/0324681 | A1 * | 10/2020 | Rogers | B62J 11/00 |

* cited by examiner

*Primary Examiner* — Don M Anderson
*Assistant Examiner* — Jonathan R Zaworski
(74) *Attorney, Agent, or Firm* — Robert G. Lev

(57) ABSTRACT

The present invention is directed to a tool for handling pitot tube covers, which are configured in a general cylindrical shape. This tool includes a threaded post configured to receive an external extension. The bottom of the tool is constituted by two parallel support arms with a slot therebetween.

6 Claims, 5 Drawing Sheets

TOOL FOR INSTALLATION AND/OR REMOVAL OF A PITOT TUBE COVER

PRIORITY INFORMATION

The present utility application claims priority from U.S. Provisional Patent Application No. 63/185,505, filed on May 7, 2021.

FIELD OF THE INVENTION

The present invention is related, in general, to tools used to install or remove pitot tube covers from elongated pitot tubes. In particular, the present invention is directed to an optimum tool arrangement for handling variations of a pitot tube covers having a rigid shell and a rear opening.

BACKGROUND ART

The use of pitot tube covers is ubiquitous in the operation of almost all aircraft. Pitot tubes are essential for gathering the information necessary to safely pilot virtually any aircraft, as well as some other vehicles. Unfortunately, pitot tubes are easily clogged, or otherwise contaminated, compromising the essential data collected by measuring air flow through the pitot tubes.

As a result, there are a wide variety of different pitot tube covers to accommodate virtually any style, size or shape of pitot tube that could be mounted on an aircraft, or any other vehicle that would use the type of information gathered through pitot tubes. Pitot tube cover configuration can also be dictated by the location of the pitot tube on the aircraft or other vehicle, as well as the expected duty cycle of both the vehicle and the pitot tube cover.

Pitot tube covers are so prevalent, because of their necessity, that they must be applied to a wide range of different aircraft sizes and configurations. Some of these aircraft configurations do not permit ground crew to have easy access to the pitot tubes. In some cases, the pitot tubes are located at such a height so as to be out of reach of aircraft maintenance personnel on the ground. In some situations, ladders, lifts, or other similar devices are required for access, but may not be readily available or easily applicable to help install or remove pitot tube covers.

Many of these pitot tube covers have been designed to protect a specific type of pitot tube on a specific type of aircraft (or other vehicle). Many pitot tubes are located in places where maintenance or ground crew will have a difficult time reaching them, or are in very confined spaces. As a result, some pitot cover designs are often awkward to handle. This is exacerbated by the fact that the pitot tube covers should be left on as long as possible before taxiing the aircraft, in order to avoid environmental contamination immediately before the aircraft is moving to the runway.

The difficulty involved in removing pitot tube covers at the correct time (or at all) has resulted in the proliferation of many designs for self-removing pitot tube covers. There are self-removing pitot tube covers for almost every type and position of pitot tube. However, these covers bring their own sets of drawbacks. These can include, but are not limited to, the complete destruction of a useful pitot tube cover, generating debris on the tarmac, and leaving residue on the pitot tube potentially clogging the tube opening. Further, some of the best self-removing pitot tube covers can be quite expensive, and they are often lost as an aircraft takes off. Consequently, it is very important that ground crew be able to remove pitot tube covers from a wide variety of different aircraft locations quickly and efficiently, just before the aircraft is ready to taxi.

Likewise, it is important to replace pitot tube covers on returning aircraft as soon as feasible in order to avoid contamination of the pitot tubes. Often, it is difficult to access the pitot tube in a timely fashion due to the placement of the pitot tubes on the aircraft, and the unavailability of any means, such as ladders, to access pitot tubes by ground crew. These conditions are addressed by the use of tools with considerable extensions to add to their reach, in order to safely remove or replace pitot tube covers. A wide variety of conventional extension configurations (such as those in the attached Appendix) are known and available.

Tools for handling pitot tube covers are further complicated by the wide range of different shapes and sizes of pitot tube covers available, or in use today. A wide range of examples are found in U.S. patent application Ser. No. 17/179,774 ('774), to the same inventors, and the same Assignee. This application is incorporated herein by reference. A review of various pitot tube cover designs, as depicted in the '774 drawings, reveals a wide variety of different cover shapes that can be handled or at least partially manipulated (removed from the pitot tube) by a wide variety of different tool types.

There are arrangements that will work to remove certain types of pitot tube covers, such as that depicted in FIG. 6A of the subject '774 application. For such a pitot tube cover, all that is needed is a hook to pull down on sail surface 5 to remove the cover from the pitot tube. Unfortunately, placement of the pitot tube cover on the pitot tube is often not nearly as simple. Also, the example in FIG. 6A must be installed by hand, unless a specifically designed tool is available.

Some pitot tube cover designs (FIG. 4 in the subject '774 application) contain special modifications in order to accommodate specific tools that interface with the pitot tube cover. However, each one of these pitot tube configurations requires a special tool to fit the special structures (such as notch 33) formed in the pitot tube cover, thereby limiting the usefulness of the tool. Another problem exists in that a simple notch (such as 33 in FIG. 4) may not provide a very secure interface for a tool on an extension capable of reaching the pitot tube with the cover. Further, the mechanical leverage of such an arrangement is questionable, making a tight fit of the cover over the pitot tube very awkward to achieve. Consequently, there may be serious difficulties in manipulating the cover onto or over the pitot tube, or even removing the cover from the pitot tube. Clearly, better arrangements are necessary if pitot tube covers are to be handled properly under all conditions.

Easy removal of the pitot tube cover becomes more problematical with the cylindrical pitot tube cover design such as that depicted in FIG. 8 in the subject '774 application. A substantial number of the more advanced designs embody a similar cylindrical configuration. This streamlined configuration creates a tight hold on the pitot tube, and makes removal by a simple tool, such as a hook, far more difficult. This is due, in part, to the fact that many of these covers have interiors that are designed to tightly grasp the pitot tube in order to keep foreign material from entering the pitot tube. Such configurations (including the split discs 2 in FIG. 13 of the subject '774 application) make removal of the pitot tube cover far more difficult, and often make application of the pitot tube cover with just a simple tool virtually impossible.

Even with a more complicated tool that can be used to grasp a flange (such as 34 in FIG. 13 of the '774 application), the processes of both removal and installation of the pitot tube cover are still very difficult. Because of the proliferation of the cylindrical-type pitot tube covers, there is a need for a tool that will work with long extensions and still be easily used to securely install or remove tightly fitting pitot tube covers.

SUMMARY OF THE INVENTION

It is a primary goal of the present invention to provide a tool that can securely accommodate a cylindrical pitot tube cover, both for application to a pitot tube, and removal from the pitot tube.

It is another object of the present invention to provide a tool that can be mounted on a variety of different extension arrangements, and still function to secure a pitot tube cover.

It is a further object of the present invention to provide a tool for handling a pitot tube cover which has a lower flange and an extended banner or flag, hanging therefrom.

It is an additional object of the present invention to provide a handling tool for a pitot tube cover where the tool is capable of handling the pitot tube cover securely in a variety of different positions for both installation and removal of the pitot tube cover.

It is yet an additional object of the present invention to provide a handling tool for a pitot tube cover that fits tightly over an associated pitot tube.

It is again a further object of the present invention to provide a tool for handling a pitot tube cover of the type that has a smooth, annular, unbroken surfaces.

It is yet an additional object of the present invention to provide a handling tool for a pitot tube cover where the tool is easily attachable and detachable from the pitot tube cover.

It is again another object of the present invention to provide a tool for handling a pitot tube cover that can be quickly and easily attached to, or released from, a pitot tube cover with a relatively simple movement by the tool handler.

These and other goals and objects of the present invention are achieved by a pitot tube cover handling tool configured for installation and/or removal of a pitot tube cover configured to fit on an elongated pitot tube having an opening at a near end mounting to a vehicle on a distal end of said pitot tube. The pitot tube cover has a rear portion, including an aperture to accommodate the pitot tube, an inner passage along a major axis for holding the pitot tube, upper and lower edges along the exterior length of the pitot tube cover substantially parallel to the major axis, and a substantially closed front portion. The handling tool includes a nose structure configured to fit over the substantially closed front portion of the pitot tube cover to at least partially enclose the substantially closed front portion of the pitot tube cover. The handling tool also includes two substantially parallel support arms extending rearward from the nose structure. The support arms are configured to extend on either side of the lower edge of the pitot tube cover forming a slot. The handling tool further includes means for holding the rear portion of the pitot tube cover to a distal end of each of the parallel support arms.

DETAILED DESCRIPTION OF THE PREFERRED EMBODIMENTS

Figure 1A:
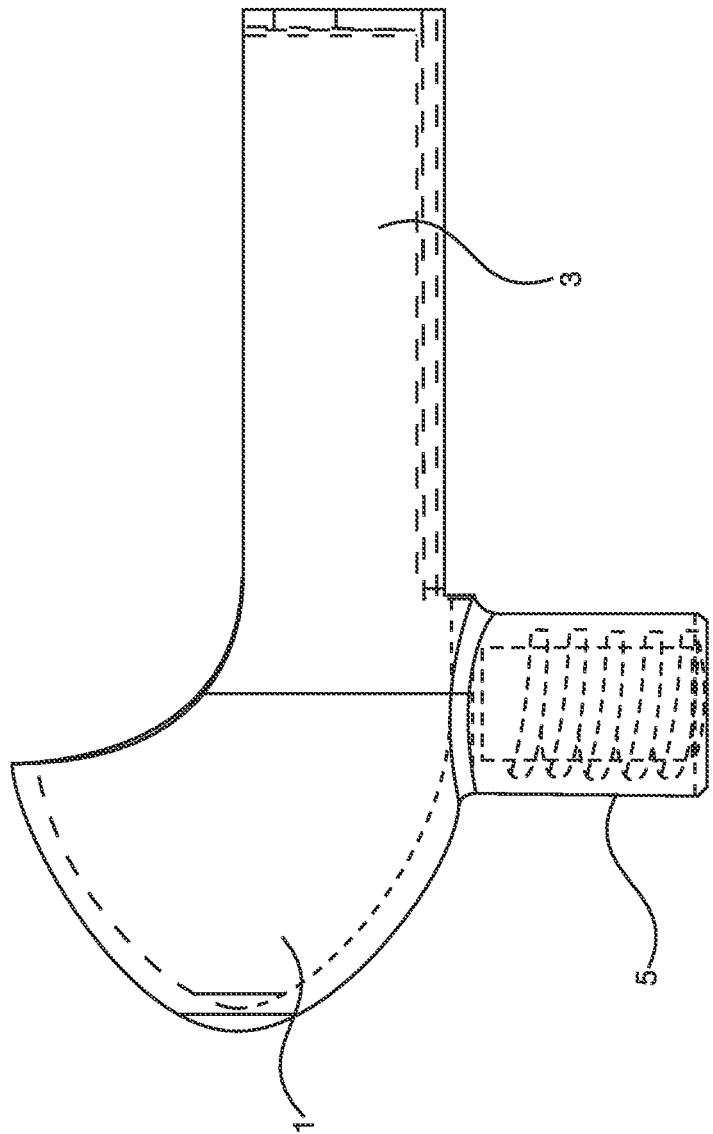
FIG. 1A is a side view of the subject installation/removal tool.
Figure 1B:
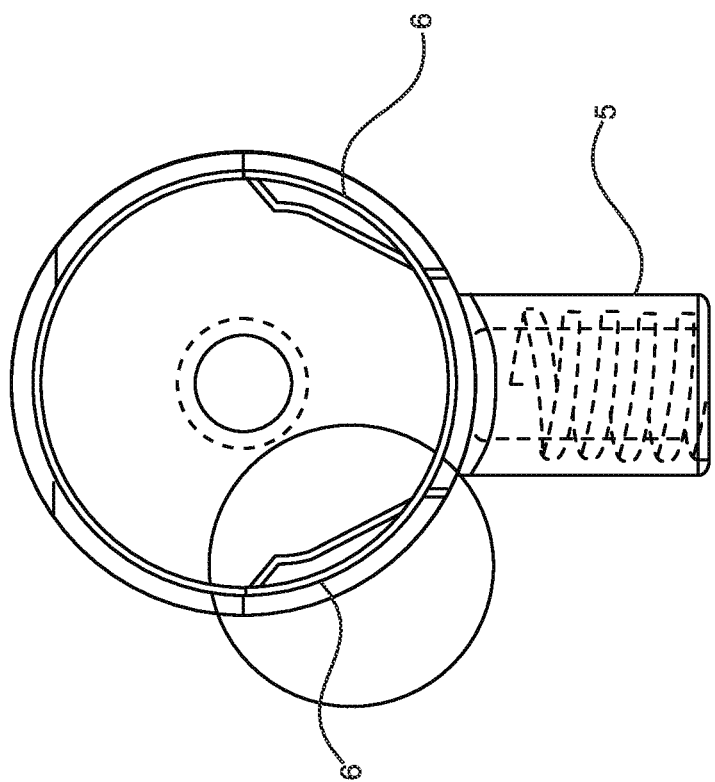
FIG. 1B is a front view of the subject installation/removal tool.
Figure 1C:
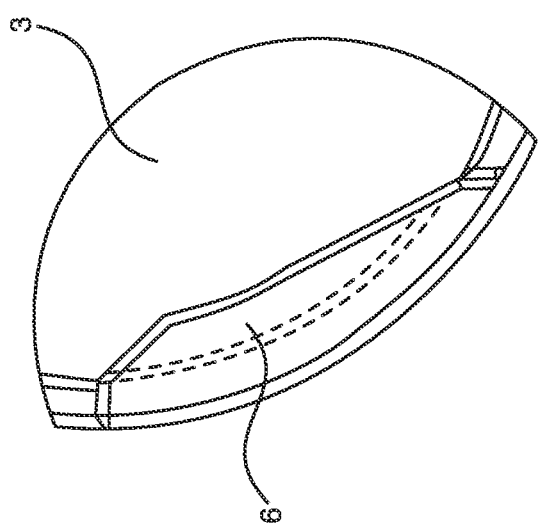
FIG. 1C is a detailed front view depicting one aspect of the subject installation/removal tool.
Figure 1D:
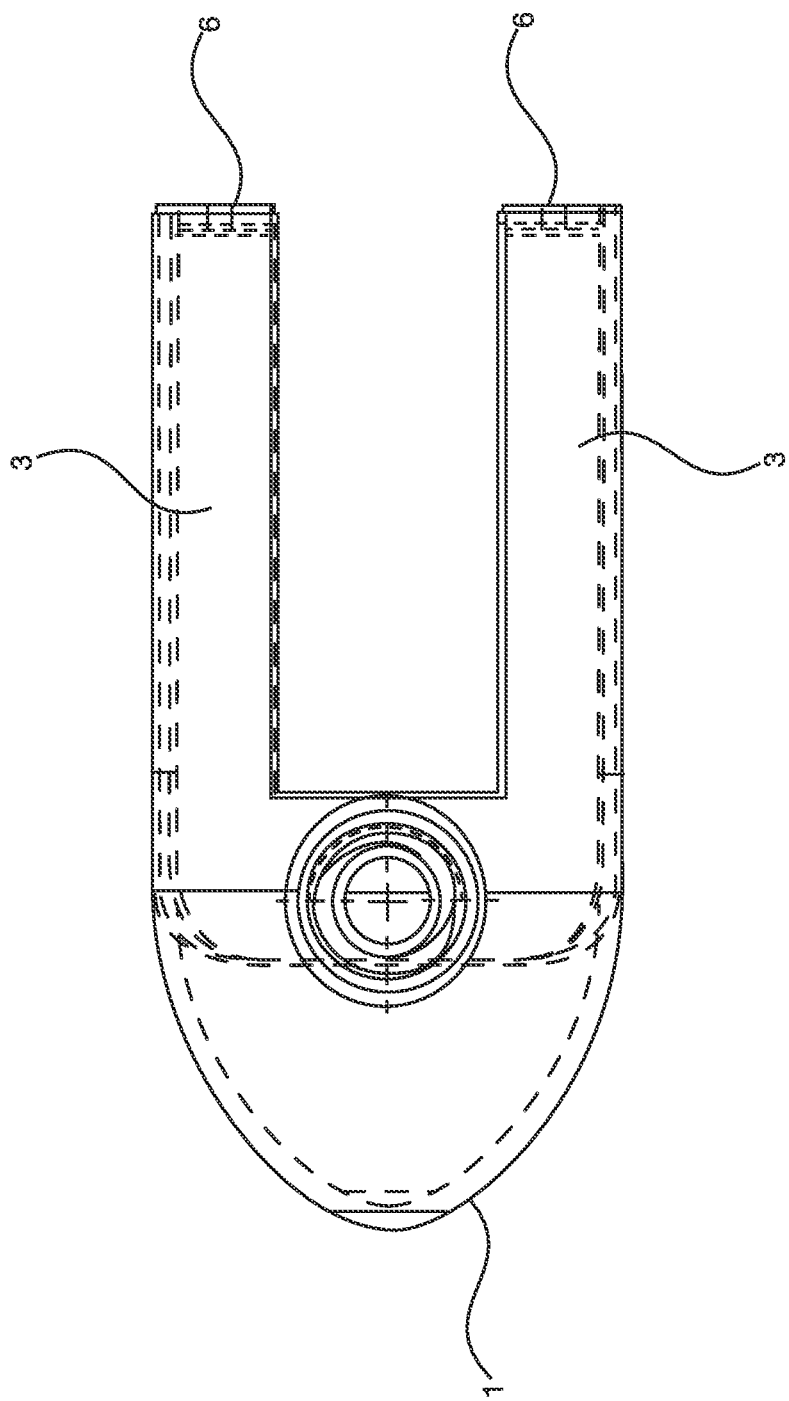
FIG. 1D is a top view of the subject installation/removal tool.
Figure 1E:
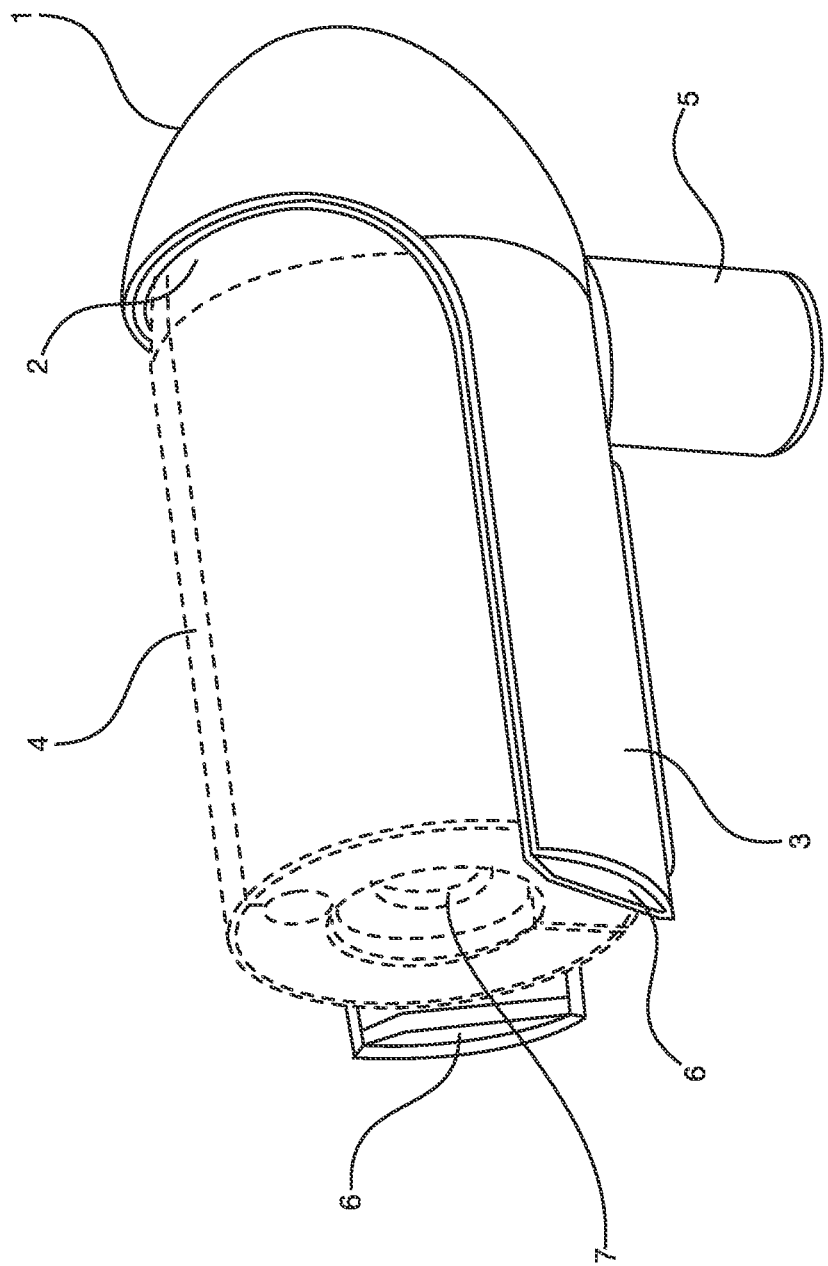
FIG. 1E is a side/rear perspective view of the subject installation/removal tool holding a cylindrical pitot tube cover.

The pitot tube installation/removal tool 10 is particularly suitable for the various cylindrical/cone designs of pitot tube covers depicted in FIGS. 13-34 of U.S. patent application Ser. No. 17/179,774, incorporated herein by reference. However, other variations and shapes can also be handled by the subject installation/removal tool 10. When necessary, the subject installation/removal tool 10 can be used with an external telescoping pole (not shown) that fits into threaded post 5. A wide variety of different telescoping poles, and other extension arrangements can be used with the subject installation/removal tool 10.

The installation/removal tool 10 is preferably of a high-strength, moderately flexible, non-brittle polymer. Examples are polypropylene or nylon. However, tool 10 can also be a lightweight metal such as aluminum, or even wood. It is noted that a flexible polymer material is less likely to scratch an airframe finish, and so is the preferred construction material.

The installation/removal tool 10 is, preferably, of a one-piece design with a front cup or nose structure 1 to receive a front portion or a nose cone 2 of the pitot tube cover 4. There also to rearward extending support arms 3 that extend along the length the pitot tube cover 4. A threaded post 5 extends from the intersection of support arms 3, and attaches tool 10 to a threaded end piece of an extension piece such as a telescopic tube (shown in the Appendix). There is also a retaining stop 6 at the distal end of each support arm 3, configured to hold the pitot tube cover 4, but still permit easy release of the pitot tube cover 4 from the handling tool 10.

In operation, the pitot tube cover 4 is placed into tool 10 from the back of the tool, at a nose-down angle, into the nose or front cup 1. Should the pitot tube cover 4 have a lower flange 34 and banner 7 (such as that depicted in FIG. 13 of Ser. No. 17/179,774), the flange 34 and banner 7 would be positioned between support arms 3 of the handling tool 10. The pitot tube cover 4 is pressed forward into the flexible nose portion 1 of the handling tool 10, and the rear of the cover angle downward so that the rear cover portion of the cover clears retaining stop 6 at the distal ends of the support arms 3. Once this is done, pressure by the installer against the nose portion 1 is released and the pitot tube cover 4 is held firmly by retaining stop 6 within the handling tool 10.

If needed, an external pole (as shown in the Appendix) is then adjusted to a length appropriate to reach the pitot tube attached to the airframe (shown in the Appendix). The pitot tube cover 4 is then positioned with the open tip of the pitot tube, and aligned along to the length of the pitot tube, so that the major axis of the cover 4 is aligned with that of the pitot tube.

As the rear pitot tube cover aperture 7 is moved (within handling tool 10) to the pitot tube for installation, alignment of the major axis of the cover 4 is maintained as the pitot tube cover is forced onto the pitot tube. To assure that the pitot tube cover 4 is positioned all the way onto the pitot tube (when the internal heat-resistant butt plate touches the tip of the pitot tube) a little additional force can be added once the cover 4 stops sliding easily over the pitot tube. Approximately 1-4 pounds of force will be required to slide the pitot tube cover 4 over the pitot tube until the tip of the pitot tube is against to the internal butt plate of the cover 4.

Removal of the pitot tube cover 4 from the handling tool 10 can be accomplished by moving the rear of the handling tool 10 downward at an angle to pitot tube cover 4, while pressing nose 1 against the front of cover 4. The space between the support arms 3 is positioned such that they clear any flange, banner or hinge structures 9—along a lower edge (FIG. 13 of '774). Once this pivot operation is done, the handling tool 10 is moved away from the front of the pitot tube cover 4 at an angle, while the rear of the tool 10 clears the rear of the cover 4 with retaining stops 6.

The relative ease with which the pitot tube cover 4 is detached from the handling tool 10 is due to the general flexibility of the handling tool 10 structure. This includes the nose structure 1 which flexes. This flexibility is facilitated, in part, by the material used and, in part, by the aperture 11 at the tip of the dome-like shape of nose structure 1. This permits slight temporary deformation of the nose structure 1 when the cover 4 is pressed against it, providing additional space for the rear of the cover 4 to clear stops 6 when attaching/detaching the handling tool 10 from the cover 4. As a result, only a slight push and downward movement of the handling tool is necessary to remove handling tool 10 from the cover 4, which is now securely attached to the pitot tube (as shown in the Appendix).

It is noted that even if the pitot tube cover 4 is a cylinder without a dome-like nose (such as FIG. 28 in the '774 application), the handling tool 10 will still operate in the same manner to allow easy attachment of the handling tool to the pitot tube cover 4 in accordance with the aforementioned operation. Because of the slot formed between the two support arms 3, there will be no interference of any kind of latching structure along edge 9(b) of the pitot tube cover 4. Further, because there is no upper structure, there is no chance of interference between a hinge structure on upper edge 9(a) and the handling tool 10.

Usually, installation/removal tool 10 is used with some kind of extension means which screws into threaded post 5, as depicted in the Appendix. While standard Acme ¾ inch X5 are preferred, any number of different threading arrangements can also be used. Likewise, any number of different extension arrangements, including angles and articulated configurations, can be attached to the threaded post 5.

While, a single preferred embodiment has been described and depicted for a particular type of pitot tube cover, the present invention can be modified with within the general concept of the present invention so as to accommodate a wide variety of different shapes and sizes of pitot tube covers. The interpretation of the present invention should be made so as to encompass all variations, modifications, derivations, evolutions, adaptations, and embodiments that would occur to one skilled in this art and having knowledge of the present invention and a variety of different pitot tube cover designs. Accordingly, the present invention should be considered to be limited only by the following claims.

The invention claimed is:

1. A pitot tube cover handling tool configured to temporarily hold a pitot tube cover during installation and/or removal of a pitot tube cover which is configured to closely fit on an elongated pitot tube having an opening at a near end and a mounting to a vehicle on a distal end of said pitot tube, said pitot tube cover having a rear portion comprising an aperture to accommodate said pitot tube at said rear end of said pitot tube, an inner passage along a major axis for closely holding an exterior of said pitot tube, upper and lower exterior edges along a length of said pitot tube cover substantially parallel to said major axis, and a substantially closed front portion; said pitot tube cover handling tool comprising:
   a) a dome-shaped nose structure configured to closely fit over the substantially closed front portion of said pitot tube cover to substantially enclose said closed front portion of said pitot tube cover;
   b) two substantially parallel support arms extending rearward from said dome-shaped nose structure, said support arms configured to extend on either side along the length of the pitot tube cover thereby forming a linear slot; and,
   c) at least one holding structure extending perpendicularly from a distal end on each of said parallel support arms, said at least one holding structure sized and configured to extend at least partially over a rear edge of said rear portion of said pitot tube cover.

2. The pitot tube cover handling tool of claim 1, wherein said pitot tube cover handling tool comprises a cylindrical shape configured for a cylindrical pitot tube cover.

3. The pitot tube cover handling tool of claim 2, further comprising a threaded post configured for receiving an external extension and extending beneath said dome-shaped nose structure proximate said to substantially parallel support arms.

4. The pitot tube cover handling tool of claim 3, wherein said nose structure comprises an open tip, and is sized to closely fit over said front portion of said pitot tube cover.

5. The pitot tube cover handling tool of claim 4, wherein said pitot tube covering handling tool comprises a flexible polymer.

6. The pitot tube cover handling tool of claim 1, wherein said pitot tube cover handling tool comprises a single-piece flexible structure.

* * * * *